CONNECTING DEVICE FOR WAITING IN AUTOMATIC TELEPHONE PLANTS

Filed Jan. 4, 1966 2 Sheets-Sheet 1

INVENTOR.
ANTON CHRISTIAN JACOBAEUS
TORSTEN ALRIK LARSSON
BY
Hane and Nydick
ATTORNEYS

CONNECTING DEVICE FOR WAITING IN AUTOMATIC TELEPHONE PLANTS

Filed Jan. 4, 1966 2 Sheets-Sheet 2

INVENTOR.
ANTON CHRISTIAN JACOBAEUS
TORSTEN ALRIK LARSSON
BY
Hane and Nydick
ATTORNEYS United States Patent Office 3,472,968
Patented Oct. 14, 1969

3,472,968

CONNECTING DEVICE FOR WAITING IN AUTOMATIC TELEPHONE PLANTS

Anton Christian Jacobaeus, Stockholm, and Torsten Alrik Larsson, Farsta, Sweden, assignors to Telefonaktiebolaget L M Ericsson, Stockholm, Sweden, a corporation of Sweden Filed Jan. 4, 1966, Ser. No. 518,572
Claims priority, application Sweden, Feb. 11, 1965, 1,753/65; Mar. 26, 1965, 3,931/65
Int. Cl. H04m 3/00
U.S. Cl. 179—18 4 Claims

ABSTRACT OF THE DISCLOSURE

A telephone exchange serves a plurality of subscriber instruments. If a subscriber calls another subscriber and does not get an answer, the calling subscriber then indicates, by dialing, to the exchange the number of the called subscriber and a code digit indicating that he wants to be informed when the called subscriber is available. In response thereto, the telephone exchange signals the called subscriber and an indicating device in his instrument is latched. When the called subscriber notes the latched state of the indicating device, he signals the exchange which in turn notifies the calling subscriber to now call the called subscriber.

Figure 2:
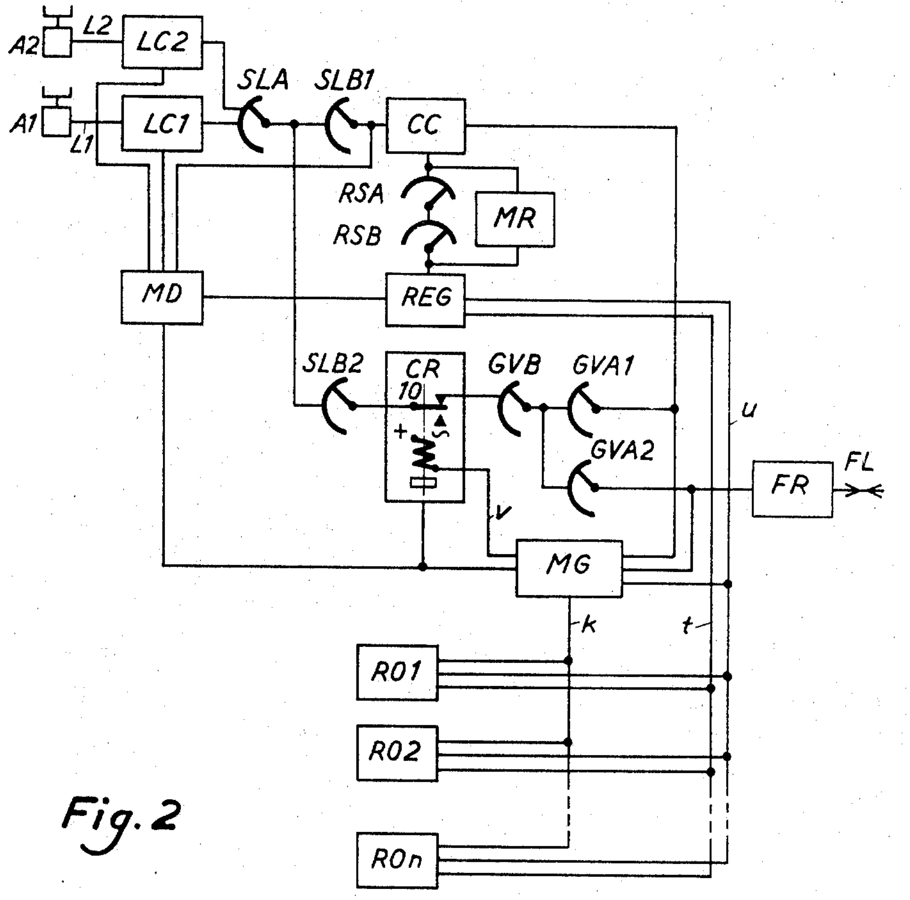

The present invention refers to automatic telephone plants or exchanges, comprising selectors for speech connections, registers and markers for the setting of the selectors, devices for identifying the numbers of calling subscribers, and at least one means that is called by a particular direction digit and is set to store the numbers of a called and a calling subscriber, respectively, when no answer is obtained from the called subscriber and the caller wants to wait until it is possible to get an answer.

It is known how to store a waiting telephone call by means of registering devices at the called telephone set. The caller then sends his telephone number to these registering devices and the called party calls the number stated, when the speech connection can be made. This way of proceeding requires complicated and expensive devices at the subscriber's set and has the disadvantage of charging the called party for the speech connection. It is also known how to store the numbers of the called and the calling subscriber in a device at the telephone plant and how to supervise the called subscriber's set by means of identifying devices and, when a call is made, either to switch the speech connection automatically or to connect a particular buzzer signal to inform that a speech connection is waiting. In the last mentioned case the wanted subscriber shall dial a particular direction digit and, by an announcer or an operator, he is informed of the number of the one, who is waiting. Also in these cases the wanted subscriber (initially called party) will be charged for the speech connection, which is undesirable.

The objects of the invention are to avoid said inconvenience, to give the called subscriber a signal, and to produce a calling signal for the waiting subscriber and to alert him, when a call is made from the called subscriber's set. These objects are satisfied by means of devices, actuated when the numbers are stored in means at the telephone plant, and that emit a particular signal to the called subscriber's set and by devices at this set, receiving said particular signal and making a latching marking at the subscriber's set, and thereby that a call from the plant, marked in this way, is identified by said means, which causes an emission of a calling signal to the waiting subscriber's set.

Figure 1:
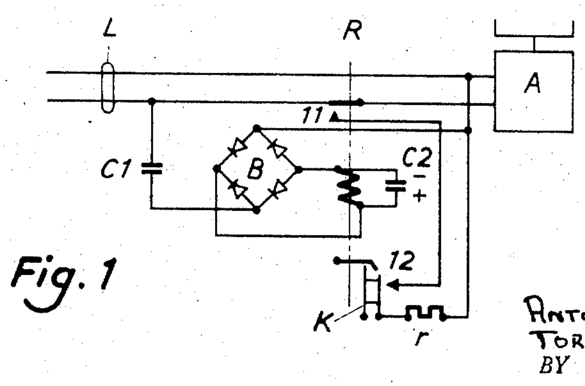

The invention will be more fully described below with reference to the drawing wherein:

FIG. 1 indicates the auxiliary devices in a subscriber's set.

FIG. 2 indicates traffic channels and connecting means in the telephone plant.

Figure 3:
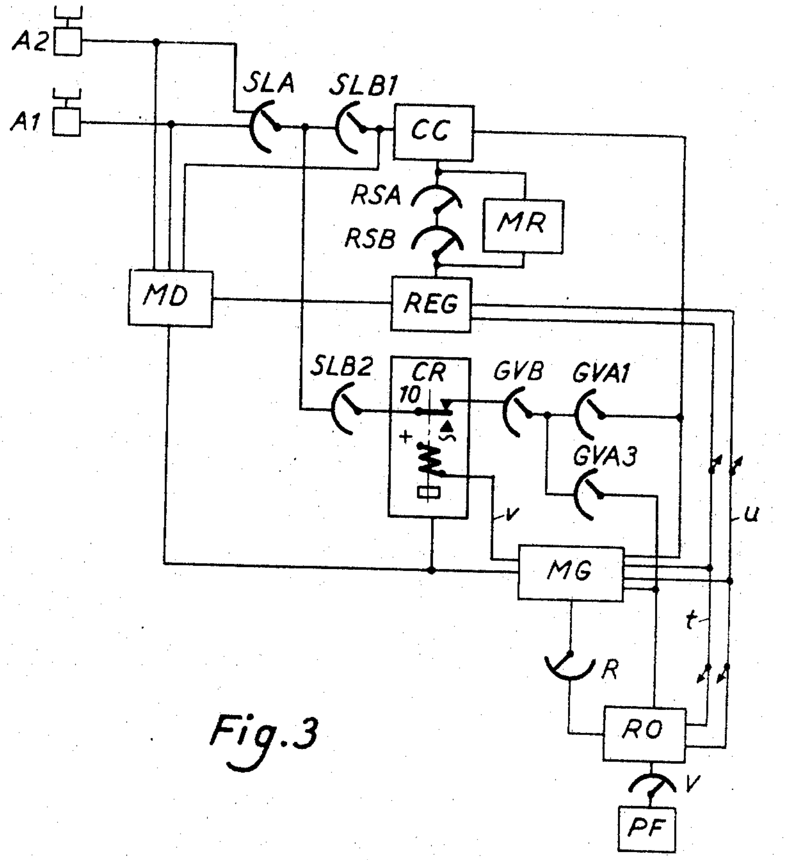

FIG. 3 shows a complete embodiment of the invention.

In FIG. 1, A is a subscriber's set connected to a subscriber's line L, and R is a telephone relay having a winding which is part of a rectifier bridge B and is connected between the line branches of the subscriber's line in series with a capacitor C1. In parallel with the winding of the relay there is an electrolytic capacitor C2. The relay R actuates a contact 11 and a flap K, the flap in its turn actuating a contact 12. Through the contacts 11 and 12 a resistor *r* is temporarily connected between the line branches when the relay R is operating.

Ordinary calling signals to the subscriber's set A are of short duration and cause the electrolytic capacitor C2 to be only slightly charged, and so the relay R does not operate at these signals. If a long calling signal is received from the telephone plant, the capacitor C2 has the time to become so strongly charged that the winding of the relay R receives enough current for the operation of the relay. The flap K is released and the contacts 11 and 12 are closed. The loop is closed through the resistor *r*, which corresponds to an answering signal from the telephone set A. The answering signal is received in a known way in the telephone plant, so that the ringing is disconnected. After the capacitor C2 discharges, the relay R releases. The contact 11 opens, but the flap K remains released and gives a latching signal at the telephone set A.

The long calling signal is then a particular signal for the subscriber's set and this signal is answered by an answering signal. This may of course be done in many different ways, especially if a source of current is available at the subscriber's set. Instead of a calling signal a current impulse with a relatively high voltage may be used to actuate a glow lamp or the like.

In FIG. 2 two subscribers' sets A1–A2 are shown with lines L1 and L2 and subscribers' relays LC1, LC2. The selectors SLA are primary and SLB1, SLB2 are secondary selectors for a group of subscriber sets such as A1 and A2. Associated with the selectors are a number of connecting circuits CC and CR and a marker MD, which is at the same time a call-identifier. In common for a number of groups of subscribers or subscriber sets there is a register REG with register selectors RSA, RSB, that are set by a marker MR, and a group selector device GVA1, GVA2, GVB with an associated marker MG. A connecting line FL with a line equipment FR is shown. RO1–RO*n* are particular means for the storing of waiting speech connections in accordance with the invention. In the connecting circuits CR for speech connections to the group of subscribers there is a relay device, actuating a make-and-break contact 10 for the emission of long calling signals under control of the marker MG.

Calls from the telephone or subscriber set A1 cause a connection of the line L1 through units LC1, SLA, SLB1, CC, RSA, RSB to a register REG. The calling line L1 is identified in the marker MD and its number is transmitted to and registered in the register REG at the same time as marker MD and marker MR set the selectors SLA, SLB1 and RSA, RSB, respectively. The calling party hears a buzzer tone and dials the number of the called subscriber, for example subscriber set A2, to the register REG. After this the register is connected to the marker MG and transmits the number for the line L2 to marker MG through the group of wires *u*, that passes the number on to marker MD. The speech connection is completed in a way known per se so that the connecting circuit CC is connected to the line L2 through the selectors GVA1, GVB and SLB2 and SLA. In the link between selectors GVB and SLB2 there is a connecting line CR, from which short calling signals are emitted to the telephone set A2. In a similar way it is possible to connect a speech connection between a connecting line FL and a subscriber's set A1 or A2 through units GVA2, GVB, CR, SLB2 and SLA, whereby a marker MG receives digit signals from the line FL.

If an internal speech connection inside the telephone plant cannot be made because of the fact that the called subscriber, for example subscriber A2, does not answer, the speech connection may be registered for waiting by means of an idle storing means, for example means RO1. In the form of embodiment of the invention referred to in FIG. 2 this is done by transmitting telephone numbers from the register REG to the means RO1 by means of the marker MG.

The calling subscriber, who wants waiting service, is identified at the call and his number is registered in REG. He then dials a particular direction digit followed by the called subscriber's number. The register is then connected to the marker MG and transmits said direction digit to this marker. Marker MG selects an idle storing means, for example RO1, and actuates it over the cable of wires *k* so that means RO1 connects digit marking relays to the groups of wires *t* and *u*. When the register REG transmits the called number to the marker, means RO1 senses the signals of the bunch of wires *u* and registers this number. The calling subscriber's number is at the same time transmitted from register REG to means RO1 by signals on the group of wires *t* and is registered in means RO1. These switching sequences are known per se.

The marker MG is connected to the marker MD and effects the speech connection between the calling and the called subscriber's lines, for example between lines L1 and L2. In this case, however, the contact device 10 is actuated in the connecting circuit CR by a signal on a wire *v* from the marker MG, so that a long calling signal is emitted to the subscriber's telephone set A2. This calling signal actuates the relay device R (see FIG. 1) in the set A2 so that the flap K drops and the circuit through the contacts 11, 12 and the resistor *r* is closed and the calling signal is broken. The calling subscriber hears the long calling signal being emitted and broken, and, as no more calling signals are emitted, he is informed that the called party has a signal device connected for waiting speech connections, and that this signal device has been actuated. If, however, repeated signals are issued, this means either that none of the means RO1–RO*n* is idle or that the called party has no marking device for waiting speech connections or that this marking device is disconnected. It is possible to connect a particular tone in circuit CR, when the long signal has been answered. After this the calling subscriber must put down his handset and to wait for a signal.

The call from subscriber A1 to A2 is now stored in means RO1 and, when the marker MG is released, means RO1 is switched, so that all signals appearing in the cable of wires *t* are read in means RO1 in a way known per se and are compared with a number, received via the cable of wires *u*.

When the called subscriber returns and discovers that a speech connection is waiting, he must rest the flap K in FIG. 1, lift his handset listen for a buzzer tone and emit a particular signal to the telephone plant and thereafter put back the handset. This signal may be a direction digit that is received in the register REG, or the call may be broken without any digit having been dialed. During the call the number of the calling telephone set, for example set A2, is registered in the register REG that is connected. When the handset is put back and said particular signal has been registered, the register is connected to the marker MG and the registered subscriber's number is marked in the cable of wires *t*. If the number is recognized as being registered for supervision in any of the means RO1–RO*n*, this means is connected to the marker MG and transmits the number registered in the storing means for the one waiting to the marker via the cable of wires *u*. The marker MG switches a connection from a connecting circuit CR to the waiting subscriber's telephone set, for example set A1, and a calling signal is sent from circuit CR through selector SLB2, SLA and line L1 to the telephone set A1. The communication is switched off as soon as the signal has been emitted. The storing means, for example RO1, is disconnected.

In accordance with an alternative form, an embodiment of the invention is arranged in such a way that, when a called subscriber, for example subscriber A2, discovers that a speech connection is waiting, he restores his flap K, lifts his handset and calls a particular direction digit. The number of the subscriber A2 is registered for the call in the register and, when the register has received said direction digit, it is connected to the marker. The number of the subscriber A2 is marked in the cable of wires *t* and the means, for example RO1, recognizing the number marks the number of the waiting subscriber, for example A1, in the cable of wires *u*, so that the last mentioned number is transmitted to the marker MG. At the same time a connection is obtained between means RO1 and marker MG through the cable of wires *k*. The marker switches a normal speech connection between subscriber A2 and subscriber A1 and senses whether the called line is idle or busy. If the line L1 is idle, a calling signal is emitted, after which the connection is switched off and the means RO1 is disconnected. If the line is busy the connection remains and the calling subscriber at set A2 hears a busy signal. The means RO1 is left for continuing supervision and the call may be repeated later on. In the case when the line L1 was idle, the calling subscriber again receives a buzzer tone from the register REG and has to put down his handset.

The invention may be varied in a number of different ways. At the switching of a waiting call it may thus happen that the one who is connecting is charged for the call at an arbitrary fee, as an answering signal is always received and the direction digit used can indicate the size of the fee. In the storing means RO1–RO*n* it is suitable to arrange timing devices switching off respective means after a certain time and it is also possible that they disconnect the devices during a certain time period for example from 10 p.m. to 7 a.m.

At the connecting device, described above, it is presumed that waiting occurs so seldom that there is no need for taking into consideration the inconveniences that may arise if a subscriber sets up two or more waiting speech connections, or if several subscribers connect waiting calls to the same number.

An embodiment of the invention refers to automatic telephone plants with a number of means for the storing of waiting speech connections. It premises that a subscriber, who has connected several waiting speech connections, should be informed of which speech connection is referred to by the sending of a signal, indicating that a wanted speech connection can take place. The connecting device is moreover constructed in such a way that, when at the same time several speech connections are waiting for the same called subscriber, all the waiting subscribers receive a signal, when the called subscriber marks that a speech connection may be received.

This is attained, in accordance with the invention, by means of an announcer and a selector device connected with means that, in the telephone plant, for waiting stores the numbers of a called and a calling subscriber and that is actuated, when a call from the called subscriber's telephone set is identified, and thereby that at the identifying the marker sets said selector device and connects a communication between said means and the calling, waiting subscriber's telephone set and, when an answer is obtained from the waiting subscriber, connects said announcer and controls the announcer in such a way that the called subscriber's number is indicated via the connection.

In addition to the devices, described in FIGS. 1–2, the following measures are required at the telephone plant. For each means RO, or in common for them all, or for a number of means RO for the storing of waiting speech connections, an announcer PF is required. In FIG. 3, the announcer is in common for all the means RO and is connected to one means at a time by means of a selector device V. For each means there is a group selector GVA3, which is not to be found on FIG. 2. Moreover a selector device R is indicated on FIG. 3, what causes only one of the means RO at a time to be connected to the marker MG.

The switching at a waiting is as follows. It is presumed that the subscriber at the set A1 calls the set A2 without getting an answer and wants a signal from set A2, when a speech connection may take place. The calling subscriber then makes a new call dialing a particular direction digit before dialing the number for the set A2. These numbers are registered in the register REG. Also the number of the calling set A1 is registered in the same register, which is presupposed to be done automatically by identifying in the marker MD and transmission of the number from marker MD to register REG in a way known per se. The register is connected to the marker MG and marks the registered subscribers' numbers on the cables of wires *u* and *t*, respectively, at the same time as marker MG receives a signal, indicating that a waiting speech connection is to be registered. The marker MG searches an idle registering means RO by means of the selector device R. When the means RO is connected to marker MG, means RO reads the numbers marked on the cables of wires *u* and *t* and registers them.

Then the marker MG connects a speech connection between the subscribers' sets A1 and A2 through the selectors SLA, SLB1, the connecting circuit CC, the selectors GVA1, GVB, the connecting circuit CR, and the selectors SLB2, SLA. Through a signal wire *v* the connecting circuit CR from marker MG is actuated in such a way that a particular signal is emitted to set A2, whereby a latching marking is obtained at set A2, as is described above for FIG. 1. Signals are arranged in such a way that the subscriber at set A1 understands that the latching marking has been made, and after this the calling subscriber puts back his handset and awaits a call from set A2. The connection set up is disconnected, but registerings in the means RO remain for a certain time means, for example for 24 hours, during which time RO is busy.

When the called subscriber A2 returns and discovers that a speech connection is waiting, he lifts his handset, hears the station tone and puts back his handset without dialing any digit on the dial. At the call the number for set A2 is identified by the marker MD, the number is transmitted from marker MD to an idle register REG, where it is registered. The chosen register is connected to the set A2 through the selectors SLA, SLB1, an idle connecting circuit CC and the selectors RSA, RSB, at which the marker MD sets the selectors SLA, SLB1 and the marker MR sets the selectors RSA, RSB.

The connecting circuit CC and the selectors SLA, SLB1 as well as the selectors RSA, RSB are disconnected, the register REG, however, is not released at once when the handset of the set A2 is put back, but register REG is at first connected to the marker MG and marks the number of set A2 through a signal on the cable of wires *t*. As the marking corresponds to the number that is registered in means RO as being a called number, means RO is actuated and registers the signal. At the same time the means RO is connected to the announcer PF by means of the selector V. RO is then connected to the marker MG by means of the selector R. The number for the waiting subscriber, that is the number for the set A1, is marked from means RO on the wires of the cable of wires *u* and the marking is received in the marker MG that establishes a connection between the means RO and the subscriber's set A1 through the selectors GVA3, GVB, an idle connecting circuit CR and the selectors SLB2, SLA.

The marker MG is released. Calling signals are emitted as usual from the connecting circuit CR to the set A1, if this set is idle. The connection is held from the means RO for a certain time. If the answer is obtained, the announcer PF is controlled from means RO so that the number for the called subscriber A2 is announced through the connection. After this the connection is disconnected, and units PF and RO are released. If no answer is obtained within said time, the communication is disconnected and units PF and RO are released.

If the set A1 is busy, when the connection from means RO to set A1 is connected, the marker is released and the connection is disconnected, but the registerings in means RO remain and a timing device starts. After a certain time means RO is again connected to the marker MG and a new connection is set up to set A1. If the set A1 is busy this time as well, the means RO is released and the communication is disconnected.

If several connections are waiting at one and the sime time for an answering signal from the same subscriber, the means RO that have registered the connections are connected one at a time to the announcer PF and the marker MG and are joined with the set, from which a waiting connection has been connected.

We claim:

1. In an automatic telephone system wherein a telephone exchange establishes connections between subscriber instruments connected to subscriber lines, said telephone exchange including selectors, registers and markers for establishing the connections in response to signals from a calling subscriber instrument, apparatus for indicating to a waiting calling subscriber instrument that a previously called subscriber instrument will accept a call, said apparatus comprising at least two subscriber instruments, one of said instruments being the called subscriber instrument, the other of said instruments being the calling subscriber instrument, the calling subscriber instrument including means for transmitting to said telephone exchange calling signals indicating the number of the called subscriber and for sending a special signal indicating that the calling subscriber has called the called subscriber and has received no answer, means in said telephone exchange for registering the calling subscriber's number and the called subscriber's number upon receipt of said special signal, means in said telephone exchange for sending a control signal to the called subscriber's instrument in response to said special signal, means included in said called subscriber's instrument for receiving the control signal for giving a latching indication that said instrument has been called, means responsive to said latching indication means for transmitting a response signal, via said telephone exchange, to the calling subscriber's instrument to indicate that the latching indication has been made, and means in said telephone exchange responsive to the subsequent use of the called subscriber instrument for transmitting a ringing signal to the waiting calling subscriber instrument.

2. The telephone system of claim 1 wherein the called subscriber instrument includes means for generating digit indicating signals, and said ringing signal transmitting means being energized only in response to particular digit indicating signals from the called subscriber instrument.

3. The telephone system of claim 1 wherein the called subscriber instrument includes means for opening and closing a call circuit to the telephone exchange, and said ringing signal transmitting means being energized only in response to the opening and closing of the call circuit.

4. The telephone system of claim 1 wherein said registering means comprise a plurality of storage registers for storing the number of calling and called subscriber instruments, a plurality of selecting means, each associated with a storage register for selecting the calling subscriber instrument whose number is stored in the storage register as calling and waiting when the use of the called subscriber instrument is sensed, and at least one announcing device in said telephone exchange common to said storage registers and the markers thereof to announce to the calling subscriber the called subscriber's number which is registered in a selected storage register.

References Cited

UNITED STATES PATENTS

| | | | |
|---|---|---|---|
| 3,045,067 | 7/1962 | Nilsson et al. | |
| 2,819,345 | 1/1958 | Nilsson | 179—27.1 |
| 2,753,403 | 7/1956 | Caracciolo | 179—84 |
| 1,915,383 | 6/1933 | Raymond. | |

KATHLEEN H. CLAFFY, Primary Examiner

T. W. BROWN, Assistant Examiner

U.S. Cl. X.R.

179—84